United States Patent [19]
Oberholzer et al.

[11] Patent Number: 6,119,729
[45] Date of Patent: Sep. 19, 2000

[54] FREEZE PROTECTION APPARATUS FOR FLUID TRANSPORT PASSAGES

[75] Inventors: Johannes-Ulrich Oberholzer, Kitchener; David Elzinga, Greensville; Ian MacLellan; David W. Mather, both of Waterloo, all of Canada

[73] Assignee: Arise Technologies Corporation, Waterloo, Canada

[21] Appl. No.: 09/152,197

[22] Filed: Sep. 14, 1998

[51] Int. Cl.$^7$ ...................................................... E03B 7/10
[52] U.S. Cl. ................................ 138/27; 138/28; 138/32
[58] Field of Search .................................. 138/28, 27, 32; 137/59; 126/271, 420

[56] References Cited

U.S. PATENT DOCUMENTS

| Re. 29,737 | 8/1978 | Bottum | 126/271 |
|---|---|---|---|
| 596,062 | 12/1897 | Firey | 138/28 |
| 926,092 | 6/1909 | Bright | 138/28 X |
| 2,029,630 | 2/1936 | McMichael | 138/28 |
| 2,599,325 | 6/1952 | Fritzberg | 138/28 |
| 2,629,402 | 2/1953 | Cook | 138/28 |
| 3,989,032 | 11/1976 | Harrison | 126/271 |
| 4,060,072 | 11/1977 | Johnson | 126/271 |
| 4,112,921 | 9/1978 | MacCracken | 126/271 |
| 4,142,513 | 3/1979 | Auger | 126/271 |
| 4,153,041 | 5/1979 | Grauleau | 126/271 |

(List continued on next page.)

OTHER PUBLICATIONS

Solar Engineering of Thermal Processes, 1991, Second Edition, John A. Duffie, Chapter 6, Chapter 7, Chapter 12.
Active Solar Systems, 1993, MIT, Press, pp. 221, 225–241, 318–325.
Solar Collectors, Energy Storage and Materials, 1990, pp. 442–444, 549–551.
Piping Handbook, 1992, Sixth Edition, Mohinder L. Nayyar, pp. B.205–206, B.262–B.263.
Facility Piping Handbook, 1996, Michael Frankel, pp. 5.23–5.28.
Freezing and Melting Heat Transfer in Engineering, 1991, K.C. Cheng, pp. 235–239.
Manual on the Installation of Solar Domestic Hot Water Systems, 1991, Canadian Solar Industries Association, pp. 10–16.
Solar Sidebar™ Homeowner Operation Instructions/Manual.
American Energies Technologies Inc., pp. 5, 6, 12, 32, 33.
American Energies Technologies Inc., Solar Water Heating Systems.
Thermomax Evacuated Heat–Pipe Solar Collector.
Heliodyne, Inc., GOBI Solar Collectors.
Solahart.
Frescource, Solar Components Jun. '97, Retail Pricing.
Thermo Dynamics Ltd., G Series Solar Collectors.
Thermo Dynamics Ltd., Solar Pool Heating.
Thermo Dynamics Ltd., Solar Domestic Hot Water System.
Solar Industries, Solar Pool Heating Systems.
Solar Industries, Solar Pool Heating System.
Assessment of Seasonal SDHW System Freeze Protection, Canada Centre for Mineral and Energy Technology, Efficiency and Alternative Energy Technology Branch, Aug./89.

*Primary Examiner*—Patrick Brinson
*Attorney, Agent, or Firm*—Arne I. Fors

[57] ABSTRACT

The present invention provides a fluid handling apparatus for use in cold temperature conditions. In this respect, the apparatus of the present invention comprises a freeze protected conduit having a length comprising an elongated conduit for conveying or containing an aqueous liquid and an elongated compressible elastomeric material disposed within the conduit along its length. Alternatively, the conduit may comprise, at least in part, a substantially liquid impermeable membrane which is disposed in substantially adjacent relationship with a compressible elastomeric material. When exposed to freezing temperatures, aqueous liquid in conduits will freeze and expand. The compressible elastomeric material accommodates this expansion, thereby protecting the conduit from failure.

18 Claims, 5 Drawing Sheets

U.S. PATENT DOCUMENTS

| | | | |
|---|---|---|---|
| 4,170,222 | 10/1979 | Barker | 126/420 |
| 4,184,543 | 1/1980 | Kleine | 165/170 |
| 4,227,512 | 10/1980 | Riley | 126/420 |
| 4,232,656 | 11/1980 | Teagan | 126/420 |
| 4,299,200 | 11/1981 | Spencer | 126/434 |
| 4,300,535 | 11/1981 | Munroe | 126/432 |
| 4,308,856 | 1/1982 | Durand | 126/418 |
| 4,321,908 | 3/1982 | Reed | 126/420 |
| 4,440,154 | 4/1984 | Bellows | 126/438 |
| 4,474,172 | 10/1984 | Burke | 126/449 |
| 4,637,375 | 1/1987 | Larken | 126/434 |
| 4,649,959 | 3/1987 | Wadleigh | 138/28 |
| 4,651,781 | 3/1987 | Kandlelman | 138/30 |
| 5,143,053 | 9/1992 | Baer | 126/446 |
| 5,413,091 | 5/1995 | Bourke | 126/598 |
| 5,538,043 | 7/1996 | Salazar | 138/26 |
| 5,579,828 | 12/1996 | Reed | 165/83 |

FREEZE PROTECTION APPARATUS FOR FLUID TRANSPORT PASSAGES

FIELD OF INVENTION

The present invention pertains to the field of freeze protection in fluid handling apparatus and, more particularly, to such freeze protection devices applied to solar thermal collectors and conduits.

BACKGROUND OF THE INVENTION

In colder climates where fluid carrying apparatus may be subjected to sub-zero temperatures, reliability of such equipment may be compromised by freeze damage. Under cold temperature conditions, working fluids comprised of aqueous liquids may freeze and, consequently, expand. If the working fluid is confined within rigid fluid passage walls, its expansion during freezing will be resisted. As a result, when freezing occurs, pressure increases within the fluid passage, which, depending on the rigidity, could lead to failure and rupture of the structure of the fluid passage after one or more freezing cycles.

Such reliability concerns exist with solar thermal collectors. The conversion of solar radiation to heat for building applications is achieved by circulating a working fluid, typically an aqueous liquid, through an arrangement of channels or like conduits or tubes that are typically in contact with a highly thermally conductive sheet whose selectively coated surface is exposed to the incident solar radiation. The heated fluid is then distributed to thermal storage and to building applications, such as space heating and domestic hot water heating. The actual solar radiation conversion device is a solar thermal collector.

Presently, three types of solar thermal collectors exist in building applications that embody the combination of a selectively coated sheet, or absorber sheet, and fluid-carrying channels or tubes. They are the flat plate collector, the heat pipe collector, and the evacuated tubular collector. Each type of collector can be divided into two functional zones: the collector absorber unit and the absorber unit encasement. The collector absorber unit consists of the assembly of the fluid carrying apparatus and the absorber sheet. Such working fluid carrying apparatus includes fluid passages defined by rigid walls for facilitating the transportation of the fluid through the collector absorber unit.

The prior art features several attempts to improve the ability of the collector absorber unit to endure conditions of fluid freezing for over 20 years of operation. Several means of dealing with the freezing of the working fluid have been proposed over the years by the solar industry, and by other fluid handling sectors as well.

In one method, water is removed from zones in the collecting apparatus where freezing conditions are expected. This strategy has been incorporated into the operation of drain-back and drain-down solar thermal systems. A control system signal initiates the removal of the fluid from the fluid passage that is exposed to the freezing conditions. In this case, reliability of the control system becomes critical. If the working fluid fails to be removed, then nothing protects the fluid carrying apparatus from freezing damage.

In accordance with another method, fluids with freezing points that are lower than temperatures expected during operation are used. In general, such fluids are expensive, offer poor thermal properties, and involve high fluid handling costs. In all cases, they fail to provide significant gains in cost-effectiveness and do not justify their contribution to the prevention of freezing. Prime examples of this method are the circulation of silicone oils or air in the solar thermal collector loop. Silicon oils are ol high cost. They have thermal capacities which are lower than water. To match the thermal performance of the water, silicone oils must be circulated at high mass flows that cannot be justified because of the resultant increase in fluid handling costs, such as pump costs. Moreover, silicone oil is challenging to contain, thus necessitating additional cost-generating measures. Air has a very low thermal capacity and low thermal conductivity and therefore, is only appropriate for space heating systems, which limits its scope of application.

A further means of preventing freeze damage is to inject chemical additives to lower the freezing point of the working fluid. The chemical stability of such mixtures is questionable over long operating periods, thus adding maintenance costs and creating new reliability concerns. Moreover, this method must conform with local regulations relating to domestic water contamination, thus incurring additional costs. A conventional application of this method in solar thermal systems is the addition of propylene glycol to water. Historically, this mixture has been known to break down at collector stagnation temperatures while in the presence of oxygen. Without proper maintenance the propylene glycol mixture forms clumps and becomes corrosive over time, which results in a loss of performance and capacity to protect from freezing.

Another means disclosed in the prior art is the use of a flexible and resilient insert inside the fluid channels of the solar thermal collector. Examples of such inserts are disclosed in U.S. Pat. Nos. 5,579,828; 4,227,512; 4,321,908; and 3,989,032. The insert can accommodate the expansion that the working fluid experiences upon freezing and thus protects the fluid carrying apparatus from rupturing. Although this design is very effective in freeze protection, it creates additional manufacturing costs (e.g. outfitting the fluid carrying apparatus with the insert). The operation of the insert is also plagued with reliability and durability concerns. Typically, the insert consists of a skin or sheath filled with a gas at a pressure higher than the working fluid pressure. The sheath or skin may be comprised of thin metal sheets, plastics, or elastomeric tubes. For a collector life that is expected to extend beyond the 20 year mark, flexible metallic inserts are unreliable because they will typically fail as a result of material fatigue, thermal aging, corrosion, or a combination thereof. Increasing the metal thickness to delay metal deterioration, due to corrosion or thermal aging, only increases the costs and curtails flexibility and capacity to accommodate the expansion of a freezing fluid. Over similar operating periods, plastic thin-walled inserts may get saturated with the working fluid since plastics are permeable to most fluids typically used in heat transfer applications. This renders the insert ineffective for freeze protection. In the case of solar thermal collectors, increasing the skin thickness to decrease permeability will unjustifiably increase the material costs since expensive high temperature plastics, such as Teflon™, are required to withstand stagnation conditions (which can exceed 200° C.). Similar material costs and saturation issues apply to elastomeric inserts. Furthermore, thin walled pressurized designs, whether made of metal or plastic, are not robust because they are vulnerable to skin puncture, which subsequently renders the insert ineffective upon depressurization.

Other attempts in dealing with the freeze problem have included using conduits made with flexible and resilient walls to accommodate fluid expansion upon freezing, such as that disclosed in U.S. Pat. No. 4,299,200. The walls of such conduits are made of plastics, elastomers, or metals, and therefore are similar to the materials used within the above-described inserts. As a result, this particular solution does not escape the same issues of robustness, material costs, metal fatigue, and corrosion which arise in association with the use of the insert. In addition, the use of plastics or elastomers as channel walls may impede performance of solar thermal collectors, or any heat exchanger application where this solution is incorporated because of the low thermal conductivity characteristics associated with such materials.

In yet another means of freeze protection, a controlled heat source is employed in the regions where freezing of the working fluid is anticipated. As in the first-mentioned prior art attempt at dealing with this problem, the reliability issue is not solved, but merely shifted to the operation and control of the heat source. Further, with respect to solar thermal applications, this solution adds new components and thus additional costs.

SUMMARY OF INVENTION

The present invention discloses an apparatus for freeze protection of conduits used for the transportation of aqueous liquids.

In its broad aspect, the apparatus of the present invention comprises a freeze protected conduit having a length, and which comprises an elongated conduit for conveying or containing an aqueous liquid and an elongated compressible elastomeric material disposed within the conduit along its length.

In one aspect, the apparatus of the present invention comprises a freeze protected conduit for conveying or containing aqueous liquids comprising an elongated conduit, having a length, wherein the elongated conduit comprises a rigid wall and a substantially liquid impermeable membrane. Compressible elastomeric material is provided such that it is disposed in a substantially adjacent relationship to the membrane, thereby providing structural support thereto. Compressible elastomeric material are typified by silicone foam, foamed butyl rubber, foamed neoprene, silicone sponge rubber and urethane foam.

In another aspect, the apparatus of the present invention provides a freeze protected conduit for conveying or containing aqueous liquids comprising an elongated flexible conduit, having a length, wherein the elongated conduit comprises a substantially liquid impermeable membrane which defines a fluid passage. A rigid structural support member and a compressible elastomeric material is also provided for providing structural support to the membrane.

In yet a further aspect, the surface area of the membrane of the present invention is adapted such that the membrane experiences minimal tension during freeze expansion. In this respect, the surface area of that part of the membrane in substantially adjacent relationship with the compressible elastomeric material exceeds the greater of:

(i) the area of the surface of the compressible elastomeric material in a substantially adjacent relationship with the membrane, when the liquid passages contains no fluid and the compressible elastomeric material is:
  a) in an uncompressed state, or
  b) in a precompressed state, and
(ii) the area of the surface of the compressible elastomeric material in a substantially adjacent relationship to the membrane when the compressible elastomeric material is in its compressed state as a result of freeze expansion of the working fluid.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
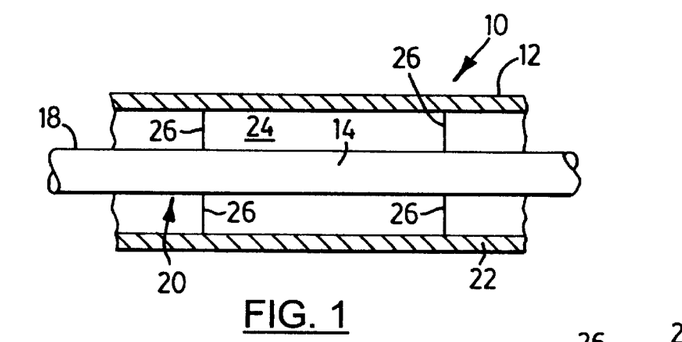
FIG. 1 is a side elevation sectional view of one embodiment of the present invention.

Referring to FIG. 1, a freeze protected conduit 10 of the present invention, having a length, comprises an elongated conduit 12 for conveying or containing aqueous liquid, and an elongated, compressible elastomeric material 14, less rigid than conduit 12, disposed within conduit 12 along the above-mentioned length.

The compressible elastomeric material, such as typified by numeral 14 in FIG. 1, is comprised of resilient, compressible elastomeric material that has an elasticity that provides a stress-strain relationship which will keep stresses in the conduit 12 at levels below what would otherwise cause failure of conduit 12. The compressible elastomeric material 14 also has a shape memory which will provide freeze protection for the number of compression cycles anticipated over the operating life of the conduit 12. Examples of compressible elastomeric material 14 include silicone foam, foamed butyl rubber, foamed neoprene, silicone sponge rubber, urethane foam and other elastomers.

Preferably, the compressible elastomeric material 14 is fully sealed on all its sides and ends by a substantially liquid impermeable membrane 18 to form an insert 20 which is disposed inside of conduit 12. In this respect, membrane 18 behaves like a flexible wall which, along with rigid wall 22 of conduit 12, define an annular fluid passage 24.

Figure 1A:
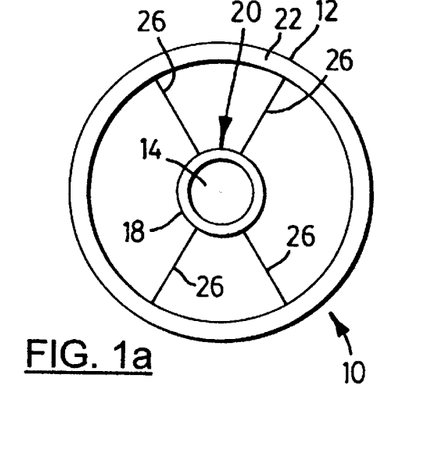
FIG. 1A is an end elevation sectional view of the embodiment illustrated in FIG. 1.

Preferably, insert 20 is disposed along the axis of conduit 12, particularly where conduit 12 is used in heat transfer applications. Because the insert 20 is centrally located, it does not interfere with heat transfer between the conduit wall and the aqueous liquid in fluid passage 24 and is, therefore, particularly suitable for use in heat transfer applications, such as a solar thermal collector or photovoltaic cells. Referring particularly to FIG. 1A, insert 20 is retained in its generally central position within conduit 12 by the use of straps, splines or other supports 26 which supports insert 20 along its length. Preferably, such supports 26 will not be continuous but instead will be intermittent or spaced along the length of insert 20 so as to minimize interference with the flow or movement of liquid within conduit 12. In one embodiment, the present invention may be provided with a plurality of splines 26 extending radially from insert 20 for biasing against the rigid wall 22 of conduit 12. Alternatively, splines 26 may extend radially inward from rigid wall 22 of conduit 12 for biasing against insert 20. In any event, use of the insert 20 can also be extended to any fluid handling apparatus that requires protection from fluid freezing damage.

Substantially liquid impermeable membrane, such as typified by numeral 18 in FIG. 1, is generally constructed of a material that does not raise any corrosion, strength, chemical stability or thermal stability issues when operating in its working environment over the life of the apparatus. A choice for membrane material is a thin metal foil coated with a protective layer such as a plastic film. Another preferred choice is a thin, flexible, plastic membrane. Examples of plastic membrane materials include polyester, such as Kaladex™, and fluoropolymers, such as Teflon™.

When aqueous liquid in conduit 12 is subjected to freezing conditions, it will solidify and expand. As a result, compressible elastomeric material 14 deforms inwardly and becomes compressed to accommodate volumetric expansion of the freezing liquid in conduit 12 by effectively increasing the size of fluid passage 24. The compressible elastomeric material 14 is of such elasticity that it provides fluid passage 24 with the ability to increase its size. Without this ability for fluid passage 24 to increase in size, the freezing of liquid and consequent expansion (hereinafter also referred to as "freeze expansion") would create tensile such stresses in conduit 12, that could cause rupture of conduit 12. Upon thawing of the working fluid, the resilience of the compressible elastomeric material 14 enables it to spring back to its original shape. The compressible elastomeric material 14 has the additional advantage that it will not immediately lose its resiliency if the fluid permeates through membrane 18. In other words, if membrane 18 is punctured, the compressible elastomeric material 14 will not immediately lose its ability to assist in freeze protection.

Figure 2:
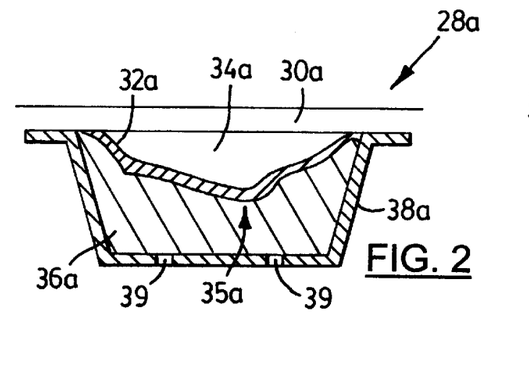
FIG. 2 is an end elevation sectional view of a second embodiment of the present invention.
Figure 3:
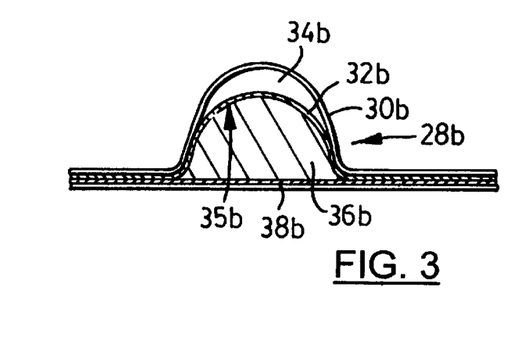
FIG. 3 is an end elevation sectional view of another example of the second embodiment of the present invention.

In another embodiment of the present invention, particular examples of which are illustrated in FIGS. 2 and 3, an elongated conduit 28a, 28b is provided comprising a rigid wall 30a, 30b and a substantially liquid impermeable membrane 32a, 32b, wherein rigid wall 30a, 30b is connected to membrane 32a, 32b to form a fluid tight seal and define a fluid passage 34a, 34b. Membrane 32a, 32b is supported by compressible elastomeric material 36a, 36b, disposed substantially adjacent to the exterior surface 35a, 35b of membrane 32a, 32b. Supporting compressible elastomeric material 36a, 36b is support member 38a, 38b, wherein support member 38a, 38b is of greater rigidity than compressible elastomeric material 36a, 36b. Preferably, the compressible elastomeric material 36a, 36b is fully contained on all its sides and ends by support member 38a, 38b and membrane 32a, 32b.

Figure 4:
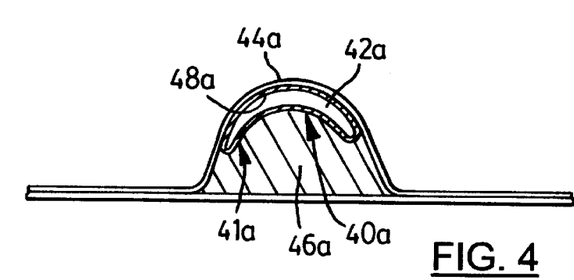
FIG. 4 is an end elevation sectional view of a third embodiment of the present invention.
Figure 5:
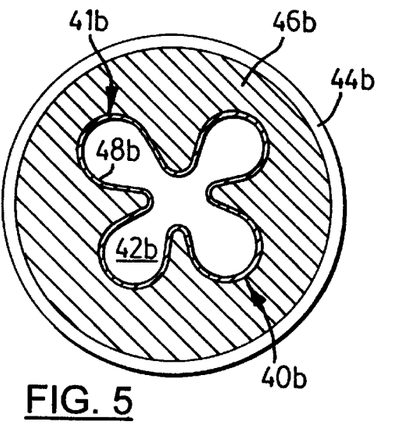
FIG. 5 is an end elevation sectional view of another example of the third embodiment of the present invention.

In yet a further embodiment, examples of which are illustrated in FIGS. 4 and 5, a flexible conduit 40a, 40b, having a length, and defining a fluid passage 42a, 42b, is disposed within rigid structural support member 44a, 44b. Also disposed within rigid structural support member 44a, 44b, and in substantially adjacent relationship with exterior wall 41a, 41b of flexible conduit 40a, 40b is compressible elastomeric material 46a, 46b.

Flexible conduit 40a, 40b comprises a substantially liquid impermeable membrane 48a, 48b, which functions as a flexible wall of conduit 40a, 40b. Membrane 48a, 48b is disposed in substantially adjacent communication with either of rigid structural support member 44a, 44b or compressible elastomeric material 46a, 46b, thereby receiving structural support from either or both of member 44a, 44b and material 46a, 46b. Preferably, flexible conduit 40a, 40b and compressible elastomeric material 46b, 46b are fully contained by rigid structural member 44a, 44b.

To further protect any of membranes 18, 32a, 32b, or 48a, 48b in the corresponding embodiments illustrated in FIGS. 1, 2, 3, 4, or 5 from tensile forces caused by freeze expansion, the surface area of the membrane 18 (32a, 32b, 48a, 48b) is preferably of a sufficient size. In this respect, depending on the geometry of the compressible elastomeric material 14 (36a, 36b, 46a, 46b), the size of the surface area of that part of the membrane 18 (32a, 32b, 48a, 48b) in substantially adjacent relationship with compressible elastomeric material 14 (36a, 36b, 46a, 46b), preferably, exceeds the greater of:

(i) the area of the surface of compressible elastomeric material 14 (36a, 36b, 46a, 46b) in substantially adjacent relationship with membrane 18 (32a, 32b, 48a, 48b), when the liquid passage contains no liquid and compressible elastomeric material 14 (36a, 36b, 46a, 46b) is;

a) in an uncompressed state, or b) in a precompressed state and (ii) the area of the surface of compressible elastomeric material 14 (36a, 36b, 46a, 46b) in substantially adjacent relationship with membrane 18 (32a, 32b, 48a, 48b), when compressible elastomeric material 14 (36a, 36b, 46a, 46b) is in its compressed state as a result of freeze expansion.

To further illustrate how geometry of compressible elastomeric material 14 (36a, 36b, 46a, 46b) dictates the preferred choice of membrane 18 (32a, 32b, 48a, 48b) surface area, the embodiment of the present invention depicted in FIG. 3 shows compressible elastomeric material 36b of a geometry wherein that part of its surface in substantially adjacent relationship to membrane 32b (hereinafter, "the operative surface area") is of a convex profile relative to membrane 32b. In this case, as compressible elastomeric material 36b deforms and compresses to facilitate freeze expansion in fluid passage 34b, the operative surface area becomes smaller. Therefore, in this case, to assist in preventing membrane 32b from experiencing tensile forces, surface area of membrane 32b should, preferably, exceed the operative surface area of compressible elastomeric material 36b when in its uncompressed state (ie. the condition where such operative surface area is at its largest point). In other geometries, an example of which is illustrated in FIG. 2, the operative surface area of compressible elastomeric material 36a is largest when the compressible elastomeric material 36a is in its compressed state. In such cases, the surface area of membrane 32a should, preferably exceed that of the operative surface area of the compressible elastomeric material 36a when in its compressed state as a result of freeze expansion.

Referring particularly to FIG. 2, in another embodiment of the present invention, support member 38a may include perforations 39 for permitting evaporation of aqueous liquid which may permeate through membrane 32a and become entrapped in compressible elastomeric material 36a. Permeation of aqueous liquid is of particular concern where membrane 32a is of a plastic material and therefore more likely to permit ingress of aqueous liquid from fluid passage 32a into compressible elastomeric material 36a. Failure to facilitate removal of the aqueous liquid from the compressible elastomeric material 36a could compromise freeze protection efficacy of the present invention. As a necessary incident of this, it is preferable for the compressible elastomeric material 36a to be of an open cell construction to facilitate diffusion of the aqueous liquid. It is understood that the use of perforated support members is not limited to the embodiment illustrated in FIG. 2, and could be used in other variations of the present invention wherever support members are used to support compressible elastomeric material of the present invention, so long as the support member does not form part of the fluid containment structure, such variations including the embodiments depicted in FIGS. 3,4,5,7, 8, 8A, 9, 10 or 11.

The above-described freeze protection means is not limited to straight lengths of conduits, as may be suggested by the embodiments illustrated in FIGS. 1, 2, 3, 4, or 5. Because of the flexibility of the compressible elastomeric material and substantially liquid impermeable membrane, and particularly the unpressurized state of compressible elastomeric material, compressible elastomeric material and substantially liquid impermeable membrane can be readily adapted for use in bends, such as elbows or tees.

In one application, the present invention may be used within a fluid handling apparatus for absorbing heat in a solar thermal collector. Generally, depending on the climatic region, solar thermal collectors are exposed to cold temperature conditions. As a result, the working fluid, which is typically an aqueous liquid, circulating through the conduit, is susceptible to freezing and consequent expansion, thereby threatening the integrity of the walls of the conduit. Accordingly, solar thermal collectors would benefit from the freeze protection offered by the apparatus of the present invention.

Figure 6:
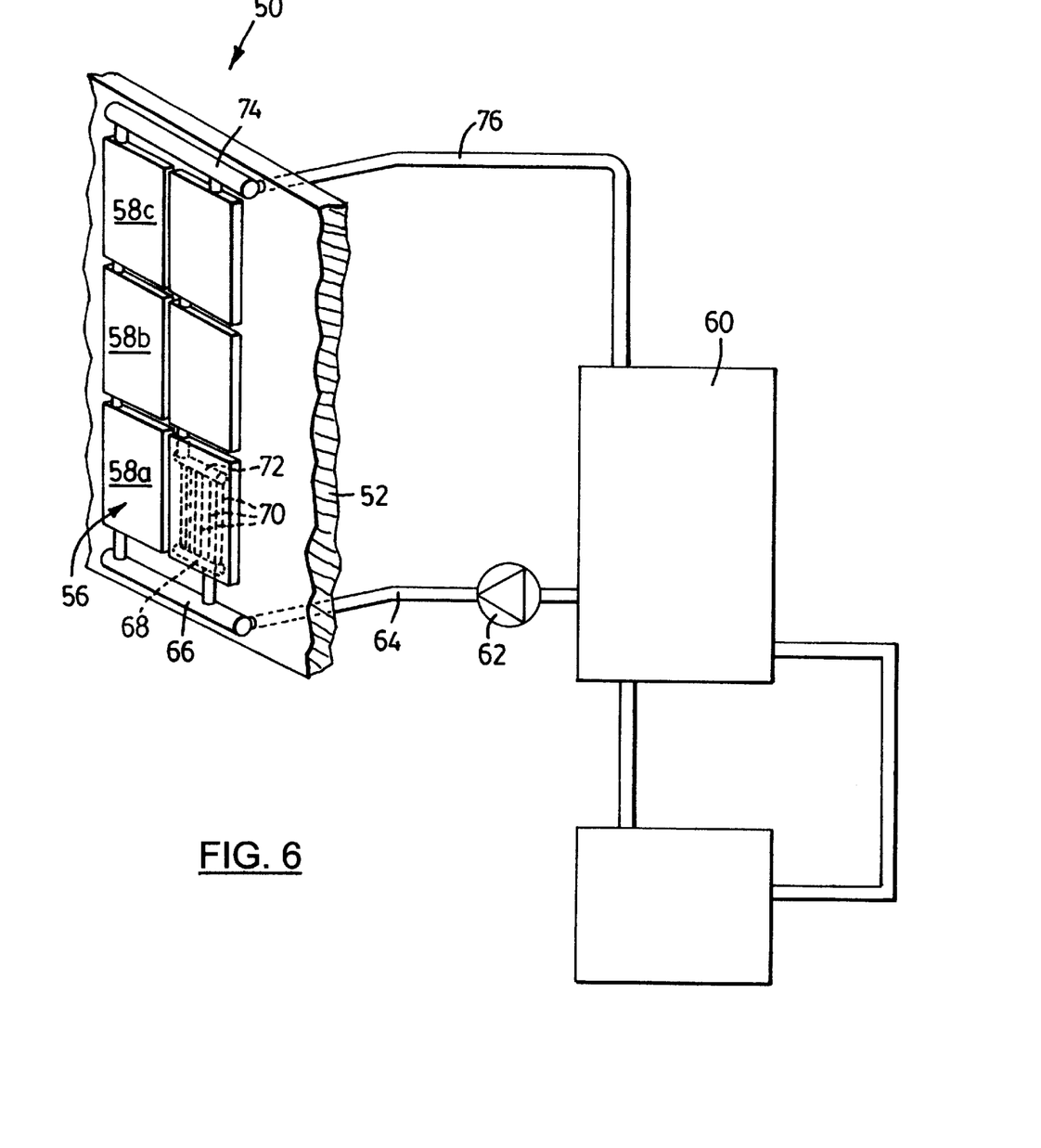
FIG. 6 is a pictorial flowsheet of a solar thermal collector process.

FIG. 6 illustrates a pictorial flowsheet of a typical solar thermal collector 50, used on the roof 52 (or facade) of a typical building structure, comprising an array of individual collectors 56, absorber units 58 associated with each collector 56, and a storage vessel 60 for containing working fluid which is circulated through collector 50. Motive means 62, such as a pump, are provided to recirculate working fluid from storage vessel 60, through collector 50, and back to storage vessel 60. Motive means 62 draws working fluid from storage vessel 60 and introduces working fluid to collector 50 via supply line 64. Supply line 64 is connected to the supply manifold 66 of collector 50 for distribution to individual absorber units 58. Supply manifold 66 supplies working fluid to absorber units 58 by connection to supply header 68 of an absorber unit 58. Working fluid is conducted through each absorber unit 58 through a plurality of closely spaced elongated piping 70 which are connected to supply header 68, and discharge into discharge header 72. Discharge header 72 may be connected to supply header 68 of another absorber unit 58 or may directly discharge to return manifold 74 for return to storage vessel 60 via return line 76. Alternatively, aqueous fluid may be conducted through solar thermal collector 50 by a single conduit. In this respect, conduit would be connected at one end to supply line 64, and to return line 76 at the other end. Within each absorber unit 58, conduit would adopt a generally serpentine geometry as a mean of enhancing heat transfer efficiencies.

Figure 7:
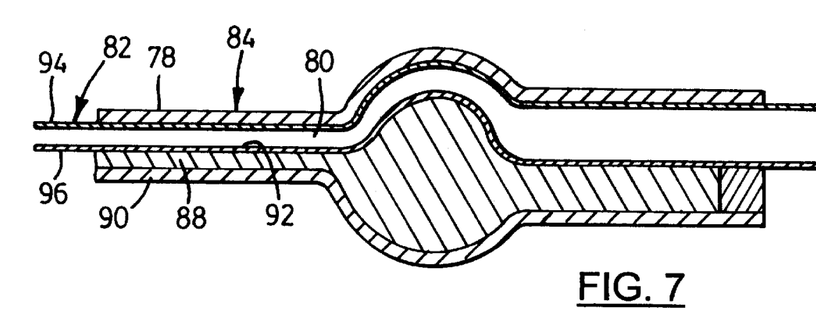
FIG. 7 is a side sectional view of a further embodiment of the present invention, as applied to a typical fluid passage within the solar thermal collector of FIG. 6.

Referring to FIGS. 6 and 7, working fluid which travels through piping 70 in any of the absorber units 58 are in contact with absorber sheet 78. Absorber sheet 78 is exposed to and absorbs incident solar radiation, thereafter converting such radiation to heat and conducting such heat to the working fluid circulating within piping 70. Heated aqueous liquid is discharged into return line 76 to be returned to storage vessel 60. Heated water in storage vessel 60 may be subsequently used as a source of domestic hot water supply or as a heat source for various applications, such as for space heating or pool heating, or could be used in commercial applications and industrial processes.

Every fluid passage in solar thermal collector 50 may be adapted for use with the freeze protection apparatus of the present invention. Referring to FIGS. 6 and 7, a section of a typical fluid passage 80 is shown adapted for use with the freeze protection apparatus of the present invention by defining such fluid passage 80 with flexible conduit 82 wherein flexible conduit 82 is disposed within rigid structural support member 84. Also disposed within rigid structural support member 84 is compressible elastomeric material 88.

Rigid structural support member 84 comprises absorber sheet 78 and undercarriage 90. Absorber sheet 78 is connected to undercarriage 90 to cause containment of flexible conduit 82 and compressible elastomeric material 88.

Flexible conduit 82 comprises a substantially liquid impermeable membrane 92, which functions as a flexible wall for conduit 82, and includes an upper wall 94 and a lower wall 96. Upper wall 94 is disposed in substantially adjacent relationship with absorber sheet 78, thereby receiving structural support from absorber sheet 78. Additionally, such configuration facilitates conductance of heat from absorber sheet 78 to aqueous liquid in fluid passage 80 of conduit 82. Lower wall 96 is disposed in substantially adjacent relationship with compressible elastomeric material 88, thereby receiving structural support from compressible elastomeric material 88.

Figure 8:
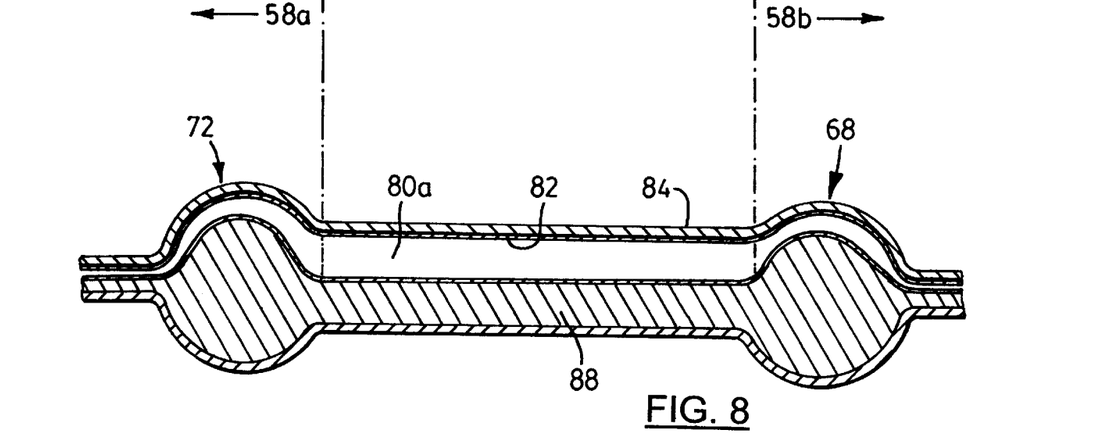
FIG. 8 is a side sectional view of a further embodiment of the present invention, as applied to a fluid passage between the absorber units within the solar thermal collector of FIG. 6.

For further illustration, FIG. 8 shows a fluid passage 80a within collector 50 (FIG. 6) between adjoining first absorber unit 58a and second absorber unit 58b. Fluid passage 80a connects discharge header 72 of first absorber unit 58a with supply header 68 of second absorber unit 58b. As any typical fluid passage 80 (FIG. 7) in collector unit 50, fluid passage 80a is defined by flexible conduit 82, disposed within rigid structural support member 84. Also disposed within rigid structural support member 84 is compressible elastomeric material 88. In this respect, flexible conduit 82 is supported by rigid structural support member 84 and compressible elastomeric material 88.

Fluid passages between the collector unit 50 and supply line 64 (FIG. 6), including supply manifold 66, and within supply line 64, may be exposed to cold temperature conditions to some extent. The same is true with respect to fluid passages between collector unit 50 and return line 76, including return manifold 74, and within return line 76. In this respect, where such fluid passages are exposed to cold temperature conditions, the corresponding conduit is protected from freeze carnage by the present invention.

Figure 9:
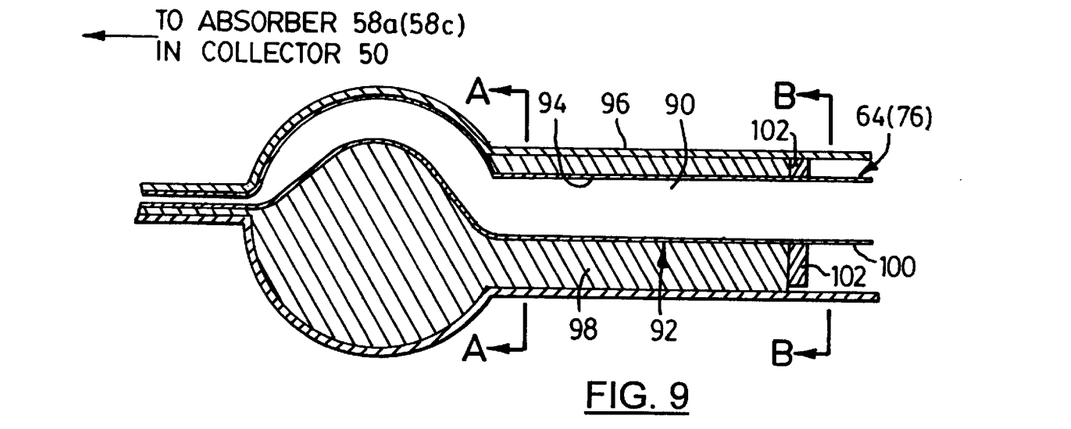
FIG. 9 is a side sectional view of the present invention as applied to the supply and return lines of the solar thermal collector of FIG. 6.
Figure 10:
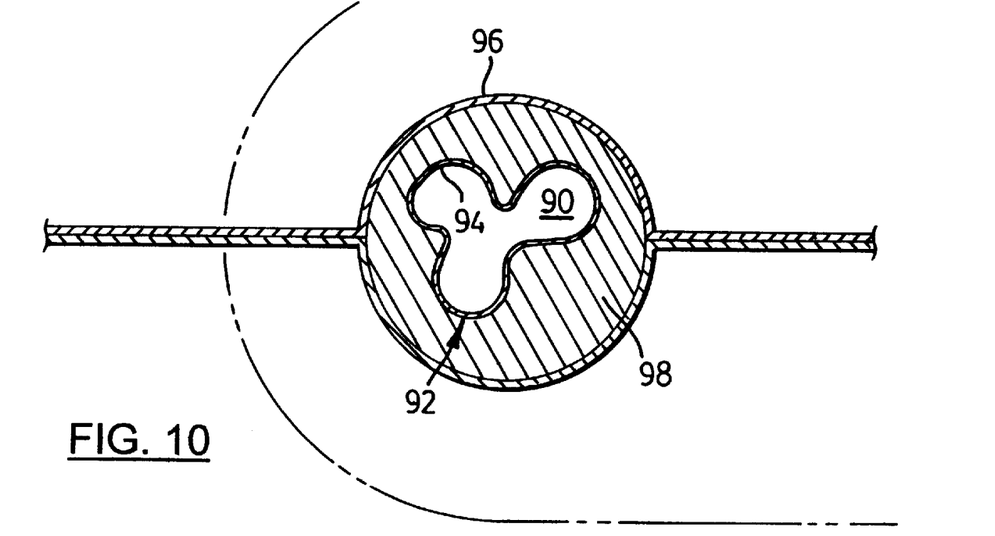
FIG. 10 is a front sectional view of the application of the present invention illustrated in FIG. 9, taken along line A—A thereof.
Figure 11:
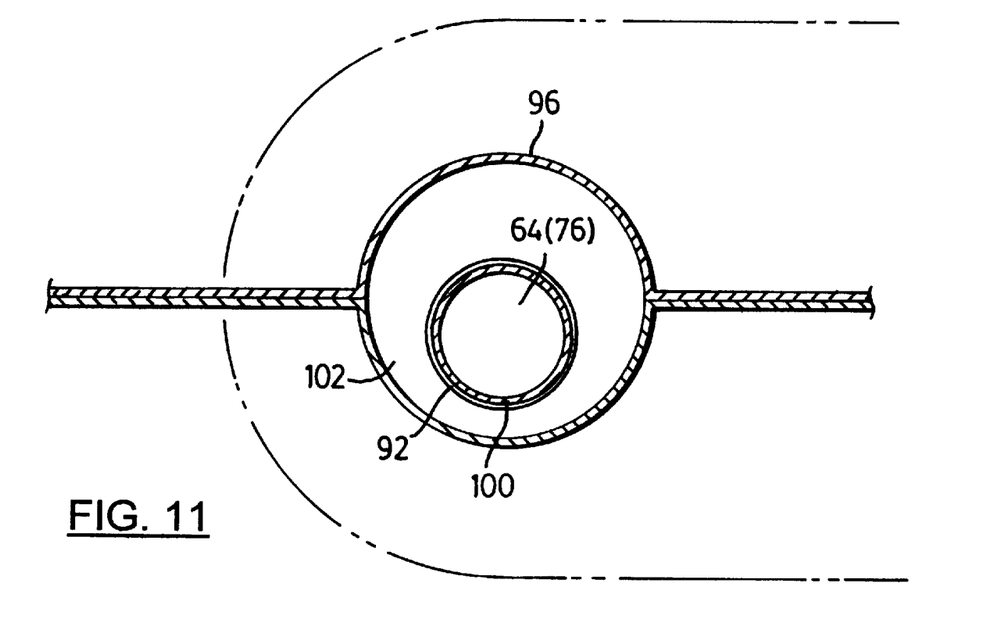
FIG. 11 is a front sectional view of the application of the present invention illustrated in FIG. 9, taken along line B—B thereof.

FIGS. 9, 10 and 11 illustrate a typical fluid passage 90 between exterior to collector 50, and is representative of the connection of collector 50 to supply line 64, or the connection of collector 50 to return line 76. Flexible conduit 92 is provided to define fluid passage 90 where fluid passage 90 may be exposed to cold temperature conditions. Accordingly, with respect to the solar thermal collector system in FIG. 6, flexible conduit 92 is provided in fluid passages connecting supply header of absorber unit 58a to supply manifold, and extend into supply line 64 where freeze damage is a concern. Similarly, flexible conduit 92 is provided in fluid passages connecting discharge header of absorber unit 58c to return manifold, and extend into return line 76 where freeze damage is a concern.

Flexible conduit 92 comprises a substantially liquid impermeable membrane 94 and is disposed within rigid structural support member 96. Also, disposed within rigid structural support member 96 is compressible elastomeric material 98. In this respect, flexible conduit 92 is supported by rigid structural support member 96 and compressible elastomeric material 98.

Where freeze damage is no longer a concern, with respect to supply line 64 or return line 76, supply line 64 or return line 76 comprises a rigid conduit 100. Rigid conduit 100 is connected in fluid tight manner with flexible conduit 92 at a location where freeze damage is not a concern. Beyond this point, freeze protection apparatus of the present invention is no longer required. In this respect, referring particularly to FIGS. 9, 10 and 11, compressible elastomeric material 98 will terminate longitudinally at end plate 102 which forms part of rigid structural support member 96.

While one application of the present invention has been described with respect to solar thermal collection 50, it should be readily understood that the present invention is equally applicable to a liquid containing conduit or other apparatus which is subject to freezing in heat transfer and non-heat transfer processes. As a further example of its application to a heat transfer process, the present invention may be used as a means of absorbing heat from a photovoltaic cell.

It will be understood, of course, that modifications can be made in the embodiments of the invention illustrated and described herein without departing from the scope and purview of the invention as defined by the appended claims.

We claim:

1. An elongated conduit for conveying or containing aqueous liquid, defining a liquid passage, comprising a first portion and a second portion, the first portion being a rigid wall and the second portion being a substantially liquid impermeable flexible membrane, wherein said membrane is disposed in substantially adjacent relationship with a compressible elastomeric material, said compressible elastomeric material being supported by a rigid support member having perforations for external drainage of liquid.

2. The conduit of claim 1, wherein said conduit forms part of a solar thermal collector.

3. The conduit of claim 1, wherein said compressible elastomeric material is selected from the group consisting of foamed butyl rubber, foamed neoprene, silicone foam, silicone sponge rubber and urethane foam.

4. An elongated conduit for conveying or containing aqueous liquid, defining a liquid passage, comprising a first portion and a second portion, the first portion being a rigid wall and the second portion being a substantially liquid impermeable flexible membrane, wherein said membrane is disposed in substantially adjacent relationship with a compressible elastomeric material, wherein said membrane has a first surface characterized by a first surface area, and said compressible elastomeric material has a second surface characterized by a second surface area, said first surface being in substantially adjacent relationship with said second surface, said first surface area exceeding the greater of:

(i) said second surface area, when said liquid passage contains no liquid and said compressible elastomeric material is:

a) in an uncompressed state, or b) in a precompressed state, and (ii) said second surface area when said compressible elastomeric material is in its compressed state as a result of freeze expansion of said aqueous liquid.

5. The conduit of claim 4, wherein said conduit forms part of a solar thermal collector.

6. The conduit of claim 4, wherein said compressible elastomeric material is selected from the group consisting of foamed butyl rubber, foamed neoprene, silicon foam, silicone sponge rubber and urethane foam.

7. A conduit for conveying or containing aqueous liquids, comprising a substantially liquid impermeable flexible membrane for defining a liquid passage, wherein said membrane is disposed in substantially adjacent relationship with a compressible elastomeric material, said compressible elastomeric material being supported by a rigid support member having perforations for external drainage of liquid.

8. The conduit of claim 7, wherein said conduit forms part of a solar thermal collector.

9. The conduit of claim 7, wherein said compressible elastomeric material is selected from the group consisting of foamed butyl rubber, foamed neoprene, silicone foam, silicone sponge rubber and urethane foam.

10. The conduit of claim 7 wherein said membrane has a first surface characterized by a first surface area, and said compressible elastomeric material has a second surface characterized by a second surface area, said first surface being in substantially adjacent relationship with said second surface, said first surface area exceeding the greater of:

(i) said second surface area, when said liquid passage contains no liquid and said compressible elastomeric material is:

a) in an uncompressed state, or b) in a precompressed state, and (ii) said second surface area when said compressible elastomeric material is in its compressed state as a result of freeze expansion of said aqueous liquid.

11. A conduit for conveying or containing aqueous liquids, comprising a substantially liquid impermeable flexible membrane for defining a liquid passage, wherein said membrane is disposed in substantially adjacent relationship with a compressible elastomeric material, and wherein said membrane has a first surface characterized by a first surface area, and said compressible elastomeric material has a second surface characterized by a second surface area, said first surface being in substantially adjacent relationship with said second surface, said first surface area exceeding the greater of:

(i) said second surface area, when said liquid passage contains no liquid and said compressible elastomeric material is:

a) in an uncompressed state, or b) in a precompressed state, and (ii) said second surface area when said compressible elastomeric material is in its compressed state as a result of freeze expansion of said aqueous liquid.

12. The conduit of claim 11, wherein said conduit forms part of a solar thermal collector.

13. The conduit of claim 11, wherein said compressible elastomeric material is selected from the group consisting of foamed butyl rubber, foamed neoprene, silicone foam, silicone sponge rubber and urethane foam.

14. A conduit for conveying or containing aqueous liquids comprising a substantially liquid impermeable flexible membrane for defining a liquid passage, said membrane being disposed in substantially adjacent relationship with a compressible elastomeric material, said membrane including a first portion and a second portion wherein an exterior of said first portion is disposed in substantially adjacent relationship with a first rigid structural support member and an exterior of said second portion is disposed in substantially adjacent relationship with a compressible elastomeric material.

15. The conduit of claim 14, wherein said conduit forms part of a solar thermal collector.

16. The conduit of claim 14, wherein said compressible elastomeric material is selected from the group consisting of foamed butyl rubber, foamed neoprene, silicone foam, silicone sponge rubber and urethane foam.

17. The conduit of claim 14, wherein said compressible elastomeric material is supported by a second rigid structural support member and said member is perforated for external drainage of aqueous liquid.

18. The conduit of claim 14, wherein said membrane has a first surface characterized by a first surface area, and said compressible elastomeric material has a second surface characterized by a second surface area, said first surface being in substantially adjacent relationship with said second surface, said first surface area exceeding the greater of:

(i) said second surface area, when said liquid passage contains no liquid and said compressible elastomeric material is:

a) in an uncompressed state, or b) in a precompressed state, and (ii) said second surface area when said compressible elastomeric material is in its compressed state as a result of freeze expansion of said aqueous liquid.

* * * * *